Patented July 31, 1923.

1,463,674

UNITED STATES PATENT OFFICE.

GEORGE COESTER, OF BRUNSWICK, GEORGIA, ASSIGNOR TO GEORGIA VITA LIGNO CO., OF BRUNSWICK, GEORGIA.

COMPOSITION FOR IMPREGNATING WOOD AND PROCESS OF PREPARING IT.

No Drawing. Application filed November 26, 1919. Serial No. 340,882.

*To all whom it may concern:*

Be it known that I, GEORGE COESTER, a citizen of the United States, and a resident of Brunswick, in the county of Glynn and State of Georgia, have invented a new and Improved Composition for Impregnating Wood and Processes of Preparing It, of which the following is a full, clear, and exact description.

This invention relates to a process for impregnating wood, and aims more particularly to render wood, after it has been treated with my improved process, impervious to the action of the elements or of destructive animal life.

It is a well-known fact that the destructive action upon wood of wood-attacking animals, and particularly the Teredo worm, renders it necessary that the piles of wharves, etc., be renewed frequently. Further, due to the weakening of such piles, grave danger sometimes exists to life and property upon the wharves.

Various attempts have been made to impregnate, or coat, wooden piles with a substance rendering them immune from attack from aqueous animal life, but these substances and processes have proven inefficient, for the reason that they would dissolve when exposed to the action of salt or fresh water and would cease to act as a protection for the submerged wood. Other substances and processes have been invented which fail to prevent attacks of animal life upon submerged wood except in a minor degree only.

My invention aims to provide an improved process and substance whereby wood, after having been properly treated with such substance, will become immune from the attacks of destructive animal life; and, further, aims to provide a process whereby wood, after having once been treated, will retain its animal-repulsive properties for an unlimited length of time, even although submerged and at times exposed, as, for instance, at low tide, to the air, as well as to preserve the wood.

To produce the desired results, I employ coal oil, crude carbolic acid, and bone oil, which substances I mix and heat so that they may be condensed whereby to get rid of the ammonia vapors.

This mixture is then applied to the wood to be treated and is permitted to dry. The residuum found in the utensil employed to condense the mixture, which residuum is obviously a very thick fluid, is used as a final coating for the wood.

The proportions in which the ingredients are employed are approximately as follows: To fifty gallons of coal oil I add five gallons of bone oil, to which mixture there is added crude carbolic acid up to three gallons.

The foregoing mixture is thoroughly stirred, to insure a good intermingling of the ingredients, and subsequently heated to the boiling point, which I have found to be about 80° C. The vapors produced are trapped and condensed to, as aforementioned, eliminate the ammonia vapors.

After the fluid formed by condensation is properly cooled and has been placed in an appropriate vat, the wood to be treated is preferably immersed until a thorough penetration of the fluid has been effected.

As is the case in all condensing actions, a heavy fluid residuum remains in the condensing vat, and I utilize this heavy fluid as a coating fluid after the wood which has been impregnated has thoroughly dried.

It will be found that after the finishing coat has been applied, this process will act as an absolute preventative against the attacks of destructive marine animals.

It will obviously be appreciated that the proportions of the ingredients employed may be varied to a certain extent and that the finishing coat may be eliminated if it is so desired.

Having thus described my invention, I desire to claim:

1. A mixture for impregnating wood consisting of coal oil, bone oil, and crude carbolic acid.

2. A mixture for impregnating wood for the purposes specified consisting of coal oil, bone oil, and crude carbolic acid in the proportions substantially of fifty gallons of coal oil, five gallons of bone oil and three gallons of crude carbolic acid.

3. A composition for impregnating wood to render the same impervious to the action of elements or of destructive animal life and especially marine animals, consisting of coal oil, crude carbolic acid and bone oil mixed and after being condensed to remove ammonia vapor and including a heavy fluid residuent.

4. A process for preparing a mixture for impregnating wood consisting in mixing oil, bone oil and crude carbolic acid together, boiling this mixture and condensing the resulting vapors.

5. A process for preparing a fluid mixture for the purpose of impregnating wood consisting in mixing coal oil, bone oil and crude carbolic acid together, boiling the mixture, and condensing the resulting vapors, said fluid when used as a primary coat leaving a heavy residuum in the condensing vat for use as a finishing coat over the dried primary mixture, said ingredients being combined in substantially the proportions stated.

GEORGE COESTER.